US012356037B2

United States Patent
Kim

(10) Patent No.: US 12,356,037 B2
(45) Date of Patent: Jul. 8, 2025

(54) CONTROLLER AND SYSTEM COMPRISING SAME

(71) Applicant: LG ELECTRONICS INC., Seoul (KR)

(72) Inventor: Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 18/246,104

(22) PCT Filed: Sep. 21, 2020

(86) PCT No.: PCT/KR2020/012722
§ 371 (c)(1),
(2) Date: Mar. 21, 2023

(87) PCT Pub. No.: WO2022/059825
PCT Pub. Date: Mar. 24, 2022

(65) Prior Publication Data
US 2023/0370671 A1    Nov. 16, 2023

(51) Int. Cl.
*H04N 21/422* (2011.01)
*G06F 3/16* (2006.01)

(52) U.S. Cl.
CPC ....... *H04N 21/42222* (2013.01); *G06F 3/167* (2013.01); *H04N 21/42203* (2013.01); *H04N 21/42221* (2013.01)

(58) Field of Classification Search
CPC ....... H04N 21/42222; H04N 21/42203; H04N 21/42221; G06F 3/167
See application file for complete search history.

(56) References Cited

U.S. PATENT DOCUMENTS

| 6,847,723 B1 | 1/2005 | Kiuchi et al. |
| 2019/0173687 A1* | 6/2019 | MacKay ................. G06F 3/165 |
| 2020/0161763 A1* | 5/2020 | Lee ........................ H01Q 25/00 |

FOREIGN PATENT DOCUMENTS

| JP | 2010-004156 | 1/2010 |
| KR | 10-2010-0053890 | 5/2010 |

(Continued)

OTHER PUBLICATIONS

PCT International Application No. PCT/KR2020/012722, International Search Report dated Jun. 18, 2021, 4 page.

(Continued)

*Primary Examiner* — Yassin Alata
(74) *Attorney, Agent, or Firm* — LEE, HONG, DEGERMAN, KANG & WAIMEY

(57) ABSTRACT

The present disclosure relates to a control device and a system including the same. The control device according to an embodiment of the present disclosure includes: an external device interface unit configured to communicate with an image display apparatus; a microphone; and a controller, wherein the controller determines an angle and a distance between the control device and the image display apparatus, based on a signal transmitted and received through the external device interface unit, generates a compensation signal corresponding to a voice signal transmitted to the image display apparatus, when a voice input is received through the microphone, corrects the compensation signal, based on the determined angle and distance, and processes the voice input, based on the corrected compensation signal.

18 Claims, 10 Drawing Sheets

(56) References Cited

FOREIGN PATENT DOCUMENTS

| | | | |
|---|---|---|---|
| KR | 10-2012-0072243 | 7/2012 | |
| KR | 10-2018-0107637 | 10/2018 | |
| KR | 10-2020-0012636 | 2/2020 | |
| KR | 10-2020-0043128 | 4/2020 | |
| WO | 2019-112660 | 6/2019 | |
| WO | 2019-136065 | 7/2019 | |
| WO | 2020-080638 | 4/2020 | |
| WO | WO-2020080638 A1 * | 4/2020 | ............. G10L 21/02 |

OTHER PUBLICATIONS

European Patent Office Application Serial No. 20954221.6, Search Report dated Apr. 5, 2024, 11 pages.
Korean Intellectual Property Office Application No. 10-2023-7008701, Office Action dated Jan. 16, 2025, 7 pages.

* cited by examiner

FIG. 1
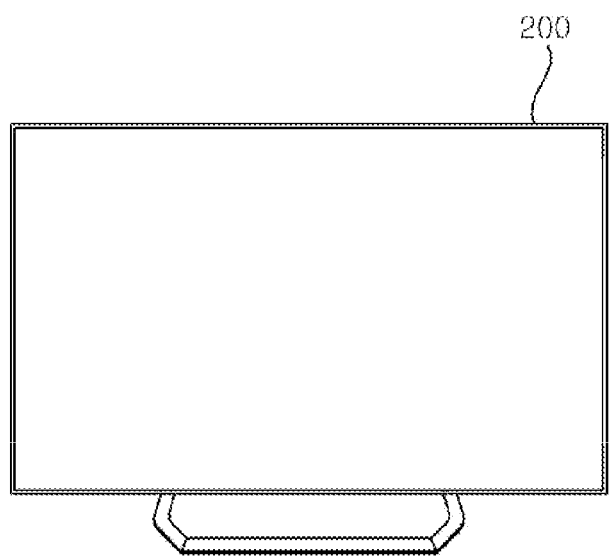
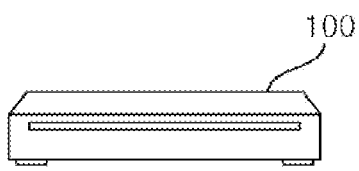
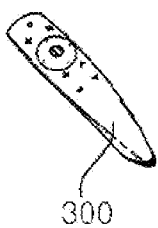

200

CONTROLLER AND SYSTEM COMPRISING SAME

CROSS-REFERENCE TO RELATED APPLICATION(S)

This application is the National Stage filing under 35 U.S.C. 371 of International Application No. PCT/KR2020/012722, filed on Sep. 21, 2020, the contents of which is hereby incorporated by reference herein in its entirety.

TECHNICAL FIELD

This disclosure relates to a control device and a system including the same.

BACKGROUND

An image display apparatus is an apparatus having a function of displaying an image that a user can view. Recently, as the demand for image display apparatus has increased in various forms along with the development of the information society, various image display apparatuses such as Liquid Crystal Display Device (LCD), Plasma Display Panel (PDP), Electro luminescent Display (ELD), and Vacuum Fluorescent Display (VFD) have been researched and used.

Such an image display apparatus may perform wired/wireless communication with various electronic devices to mutually transmit/receive data. The image display apparatus may display a screen corresponding to an image signal transmitted from an electronic device connected through wired/wireless communication, and may output sound corresponding to a voice signal.

Meanwhile, in general, in order to control electronic devices, a user directly operates buttons provided in a body of the electronic device, or uses a remote control device such as a remote control to avoid the inconvenience of moving to the body. However, even when the remote control device is used, there is inconvenience in that a user has to check and operate the operation keys for each function, and it is difficult to identify the operation keys of the remote control device when the room is dark. Accordingly, there is a problem of adding a lighting device the remote control device or operating a separate lighting device.

In addition, at the time when a user wants to control an electronic device, if the location of the remote control device is not identified or the remote control device is lost, there is a problem in that it is difficult to remotely control the electronic device. For this reason, recently, research on a method of controlling electronic devices using voice recognition technology has been actively conducted.

Meanwhile, while sound is output from the image display apparatus, when a user utters a voice to control an electronic device, the electronic device that performs voice recognition receives not only the user's voice but also the sound output from the image display apparatus. At this time, in order to increase the accuracy of voice recognition, there is a need for a method of accurately processing only the voice part uttered by a user, excluding the audio part output from the image display apparatus, among the voice inputs received by the electronic device.

SUMMARY

The disclosure has been made in view of the above problems, and may provide a control device capable of accurately excluding a sound part output from an image display apparatus among received audio inputs in consideration of the location of the image display apparatus, and a system including the same.

The disclosure may further provide a control device capable of improving the accuracy of voice recognition in consideration of the location of a user uttering a voice, and a system including the same.

In accordance with an aspect of the present disclosure, a control device includes: an external device interface unit configured to communicate with an image display apparatus; a microphone; and a controller, wherein the controller determines an angle and a distance between the control device and the image display apparatus, based on a signal transmitted and received through the external device interface unit, generates a compensation signal corresponding to a voice signal transmitted to the image display apparatus, when a voice input is received through the microphone, corrects the compensation signal, based on the determined angle and distance, and processes the voice input, based on the corrected compensation signal.

In addition, the compensation signal corresponding to the voice signal according to an embodiment of the present disclosure is a signal corresponding to sound output from the image display apparatus according to the voice signal, wherein the controller removes a portion corresponding to the sound output from the image display apparatus from the voice input, based on the corrected compensation signal, and performs a voice recognition for the voice input from which the portion is removed.

In addition, the controller according to an embodiment of the present disclosure corrects a phase of the compensation signal, based on the determined angle, and corrects an amplitude of the compensation signal, based on the determined distance.

In addition, the external device interface unit according to an embodiment of the present disclosure includes at least one array antenna having a plurality of antenna elements, wherein the controller determines a direction used for communication with the image display apparatus through the array antenna, among a plurality of directions, and determines the angle, based on the determined direction.

In addition, the controller according to an embodiment of the present disclosure receives data on a direction used for communication with the control device from the image display apparatus, and determines the angle, based on the received data on a direction.

In addition, the controller according to an embodiment of the present disclosure determines the distance based on at least one of an intensity of a signal received from the image display apparatus and a difference between a time point at which a signal is output from the control device and a time point at which a signal is received from the image display apparatus.

In addition, the external device interface unit according to an embodiment of the present disclosure includes: a first communication circuit using a first frequency band; and a second communication circuit using a second frequency band higher than the first frequency band, wherein the controller transmits a control signal to the image display apparatus through the first communication circuit, and transmits at least one of an image signal and the voice signal to the image display apparatus through the second communication circuit.

In addition, the first frequency band according to an embodiment of the present disclosure includes at least one of a 2.4 GHz band and a 5 GHz band, and wherein the second frequency band includes at least a portion of a frequency band of GHz to 100 GHz.

In addition, the controller according to an embodiment of the present disclosure calculates a distance between an object corresponding to a user and the control device, based on a signal transmitted and received through the external device interface unit, and when the voice recognition fails, transmits a control signal for lowering a volume of sound output from the image display apparatus to the image display apparatus, based on the distance between the object corresponding to the user and the control device.

In addition, the controller according to an embodiment of the present disclosure performs an operation of transmitting a first signal through the array antenna, and receiving a second signal, which is a signal that the first signal is reflected by an object, through the array antenna, in all directions, and calculates the distance between the object corresponding to the user and the control device, based on a result of receiving the second signal in the all directions.

Meanwhile, in accordance with another aspect of the present disclosure, a system including an image display apparatus and a control device, wherein the image display apparatus outputs sound through at least one speaker, based on a voice signal received from the control device, wherein the control device determines an angle and a distance between the control device and the image display apparatus, based on a signal that is mutually transmitted and received with the image display apparatus, generates a compensation signal corresponding to the voice signal transmitted to the image display apparatus, when a voice input is received through a microphone of the control device, corrects the compensation signal, based on the determined angle and distance, and processes the voice input, based on the corrected compensation signal.

BRIEF DESCRIPTION OF THE DRAWINGS

The above and other objects, features and advantages of the present disclosure will be more apparent from the following detailed description in conjunction with the accompanying drawings, in which:

FIG. 1 is a diagram illustrating a system, according to an embodiment of the present disclosure;

DETAILED DESCRIPTION

Figure 2:
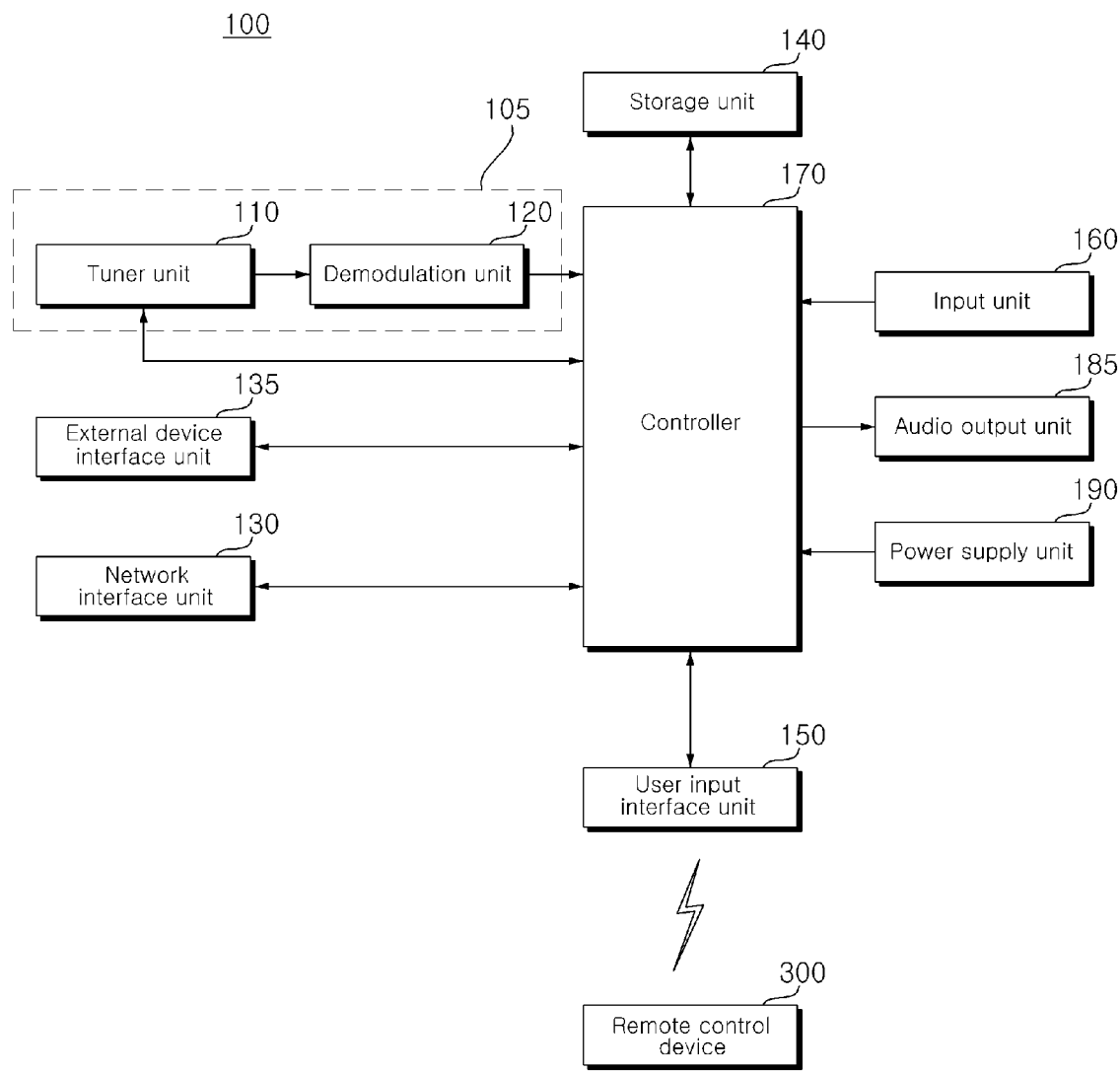
FIG. 2 is an example of an internal block diagram of a control device of FIG. 1.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. Accordingly, the "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, in this specification, it will be understood that although the terms first, second, etc. may be used herein to describe various elements, these elements should not be limited by these terms. These terms are only used to distinguish one element from another.

FIG. 1 is a diagram illustrating a system, according to various embodiments of the present disclosure.

Referring to FIG. 1, a system 10 may include a control device 100, an image display apparatus 200, and/or a remote control device 300.

The control device 100 may be a device that controls the image display apparatus 200. For example, the control device 100 may transmit a control signal for controlling the operation of the image display apparatus 200 to the image display apparatus 200.

The control device 100 may establish a wired or wireless network with the image display apparatus 200 and transmit an image signal and/or a voice signal to the image display apparatus 200. For example, the control device 100 may receive a broadcast signal, signal-process it, and transmit the signal-processed image signal and/or voice signal to the image display apparatus 200.

The control device 100 may receive broadcast signals wirelessly through an antenna, or receive wired broadcast signals through a cable. For example, the control device 100 may receive a terrestrial broadcasting signal, a satellite broadcasting signal, a cable broadcasting signal, an Internet Protocol Television (IPTV) broadcasting signal, and the like.

The image display apparatus 200 may be a device that processes and outputs an image. The image display apparatus 200 is not particularly limited as long as it can output a screen corresponding to an image signal, such as a TV, notebook computer, and a monitor.

The remote control device 300 may be connected to the control device 100 by wire and/or wirelessly, and provide various control signals to the control device 100. At this time, the remote control device 300 may include a device that establishes a wired or wireless network with the control device 100, transmits various control signals to the control device 100 through the established network, or receives a signal related to various operations processed by the control device 100 from the control device 100.

For example, various input devices such as a mouse, a keyboard, a space remote control, a track ball, and a joystick may be used as the remote control device 300.

The control device 100 may be connected to only a single remote control device 300 or be simultaneously connected to two or more remote control devices 300, and may change an object displayed on the image display device 200 or may adjust a screen state, based on a control signal provided from each remote control device 300.

The remote control device 300 may be connected to the image display apparatus 100 by wire and/or wirelessly to provide various control signals to the image display apparatus 100.

FIG. 2 is an example of an internal block diagram of the control device of FIG. 1.

Referring to FIG. 2, the control device 100 may include a broadcast receiving unit 105, an external device interface unit 130, a network interface unit 135, a storage unit 140, a user input interface unit 150, an input unit 160, a controller 170, an audio output unit 185, and/or a power supply unit 190.

The broadcast receiving unit 105 may include a tuner unit 110 and a demodulation unit 120.

A tuner unit 110 may select a broadcast signal corresponding to a channel selected by a user or all pre-stored channels among broadcast signals received through an antenna (not shown) or a cable (not shown). The tuner unit 110 may convert the selected broadcast signal into an intermediate frequency signal or a baseband image or voice signal.

For example, if the selected broadcast signal is a digital broadcast signal, the tuner unit 110 may convert the signal into a digital IF signal (DIF), and if the selected broadcast signal is an analog broadcast signal, may convert the signal into an analog baseband image or voice signal (CVBS/SIF). That is, the tuner unit 110 may process a digital broadcasting signal or an analog broadcasting signal. An analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among received broadcast signals, and convert them into intermediate frequency signals or baseband image or voice signals.

Meanwhile, the tuner unit 110 may include a plurality of tuners in order to receive broadcast signals of a plurality of channels. Alternatively, a single tuner that simultaneously receives broadcast signals of multiple channels is also possible.

A demodulation unit 120 may perform a demodulation operation by receiving the digital IF signal DIF converted by the tuner unit 110.

The demodulation unit 120 may output a stream signal TS after performing demodulation and channel decoding. At this time, the stream signal may be a signal which is obtained by multiplexing an image signal, a voice signal, or a data signal.

The stream signal output from the demodulation unit 120 may be input to the controller 170. After performing demultiplexing, image/voice signal processing, etc., the controller 170 may transmit the signal to the image display apparatus 200 through the external device interface unit 130.

The external device interface unit 130 may transmit or receive data with a connected external device. To this end, the external device interface unit 130 may include an A/V input/output unit (not shown).

The A/V input/output unit may transmit and receive signals to and from an external device. For example, the A/V input/output unit may include an Ethernet terminal, a USB terminal, a Composite Video Banking Sync (CVBS) terminal, a component terminal, an S-Video terminal (analog), a Digital Visual Interface (DVI) terminal, a High Definition Multimedia Interface (HDMI) terminal, a Mobile High-definition Link (MHL) terminal, a RGB terminal, a D-SUB terminal, a IEEE 1394 terminal, a SPDIF terminal, a Liquid HD terminal, etc. Digital signal input through these terminals may be transmitted to the controller 170. At this time, the analog signal input through the CVBS terminal and the S-Video terminal may be converted into a digital signal through an analog-to-digital conversion unit (not shown) and transmitted to the controller 170.

The external device interface unit 130 may be connected to the image display apparatus 200 such as a TV, and monitor by wire/wirelessly, and may perform input/output operations with the image display apparatus 200.

The external device interface unit 130 may include a wireless communication unit (not shown) for short-range wireless communication with other electronic device. Through this wireless communication unit, the external device interface unit 130 may exchange data with an adjacent mobile terminal. For example, the external device interface unit 130 may receive device information, executing application information, application image, and the like from a mobile terminal in a mirroring mode.

The external device interface unit 130 may perform a short-range wireless communication by using Bluetooth, Radio Frequency Identification (RFID), Wireless Fidelity (Wi-Fi), Infrared Data Association (IrDA), Ultra-Wideband (UWB), ZigBee, WiGig, etc.

The external device interface unit 130 may include a plurality of communication circuits. For example, the external device interface unit 130 may include a first communication circuit (not shown) using a first frequency band and a second communication circuit (not shown) using a second frequency band higher than the first frequency band.

The first communication circuit may use a first frequency band including at least one of a 2.4 GHz band and a 5 GHz band used for Bluetooth, Wi-Fi, and the like. The first communication circuit may perform non-directional or omni-directional communication for transmitting and receiving signals of the first frequency band.

The second communication circuit may use a second frequency band including at least a part of a frequency band of 25 GHz to 100 GHz. Here, the second frequency band may be referred to as a mmWave band.

For example, the first communication circuit may transmit a control signal for controlling the operation of the communication-connected image display apparatus 200, and the second communication circuit may transmit a large-capacity image signal and/or voice signal to the communication-connected image display device 200.

Meanwhile, in consideration of the fact that the mmWave band (e.g., 60 GHz) signal has stronger linearity than the 2.4 GHz band and 5 GHz band signals and has a large path loss due to frequency characteristics, the second communication circuit may perform communication according to a beam-forming method for intensively transmitting and receiving signals in one of a plurality of directions.

The second communication circuit may include an array antenna having a plurality of antenna elements, a plurality of phase shifters corresponding to the plurality of antenna elements, and the like. Here, the antenna element may include a patch antenna, a dipole antenna, and the like.

The second communication circuit may control phases of signals transmitted and received through a plurality of antenna elements through a plurality of phase shifters to generate a transmission beam and/or a reception beam in a specific direction among a plurality of directions.

The second communication circuit may change the number of antenna elements used to generate the transmission beam and/or reception beam, thereby determining the pattern of the transmission beam and/or reception beam.

For example, the second communication circuit may increase the number of antenna elements used to generate the transmission beam and/or the reception beam, thereby forming a beam having a narrow radiation pattern, or forming a beam having a wide radiation pattern by reducing the number of antenna elements.

In this case, when the second communication circuit forms a beam having a narrow radiation pattern, the coverage is narrower than that of the beam having a wide radiation pattern, but the antenna gain is high, thereby improving communication performance.

The network interface unit 135 may provide an interface for connecting to a wired/wireless network including the Internet network. For example, the network interface unit 155 may receive content or data provided by the Internet, a content provider, or a network operator through a network.

The network interface unit 135 may include a communication module (not shown) for connection to a wired/wireless network. For example, the network interface unit 135 may include a communication module for wireless LAN (WLAN), wireless broadband (Wibro), world interoperability for microwave access (Wimax), high speed downlink packet access (HSDPA), and the like.

The network interface unit 135 may transmit or receive data with other user or other electronic device through a connected network or another network linked to the connected network.

The storage unit 140 may store programs for processing and controlling each signal in the controller 170, or may store signal-processed image, audio, or data signals. For example, the storage unit 140 may store application programs designed for the purpose of performing various tasks that can be processed by the controller 170, and upon request from the controller 170, may selectively provide some of the stored application programs.

Programs stored in the storage unit 140 are not particularly limited as long as they can be executed by the controller 170.

The storage unit 140 may perform a function for temporarily storing image, voice, or data signals received from an external device through the external device interface unit 130.

The storage unit 140 may store information related to a certain broadcasting channel through a channel storage function such as a channel map.

FIG. 2 shows an embodiment in which the storage unit 140 is provided separately from the controller 170, the scope of the present disclosure is not limited thereto, and the storage unit 140 may be included in the controller 170.

The storage unit 140 may include at least one of volatile memory (e.g. DRAM, SRAM, SDRAM, etc.), and non-volatile memory (e.g. flash memory, hard disk drive (HDD), solid state drive (SSD), etc.).

In various embodiments of the present disclosure, the storage unit 140 and the memory may be used interchangeably.

The user input interface unit 150 may transmit a signal input by the user to the controller 170 or transmit a signal from the controller 170 to the user. For example, the user input interface unit 150 may transmit/receive user input signals such as power on/off, channel selection, and screen setting from the remote control device 400, transmit a user input signal input from a local key (not shown) such as a power key, a channel key, a volume key, and a set value to the controller 170, transmit a user input signal input from a sensor unit (not shown) that senses a user's gesture to the controller 170, or transmit a signal from the controller 170 to the sensor unit.

The input unit 160 may be provided in one side of the main body of the control device 100. For example, the input unit 160 may include a touch pad, a physical button, etc.

The input unit 160 may receive various user commands related to the operation of the control device 100, and transmit a control signal corresponding to an input command to the controller 170. The input unit 160 may transmit the control signal corresponding to an input command to the controller 170 through the user input interface unit 150.

The input unit 160 may include at least one microphone (not shown), and may receive a user's voice through the microphone.

The controller 170 may include at least one processor, and by using a processor included therein, may control the overall operation of the control device 100. Here, the processor may be a general processor such as a central processing unit (CPU). Obviously, the processor may be a dedicated device such as an ASIC or other hardware-based processor.

The controller 170 may demultiplex a stream input through the tuner unit 110, the demodulation unit 120, the external device interface unit 130, or the network interface unit 135, or may process the demultiplexed signals to generate and output signals for image or voice output.

The image signal and/or voice signal processed by the controller 170 may be transmitted to the image display apparatus 200 through the external device interface unit 130.

The voice signal processed by the controller 170 may be transmitted to the audio output unit 185.

The audio output unit 185 may include at least one speaker (not shown). The audio output unit 185 may receive a voice signal processed by the controller 170 and output the signal as a voice.

Although not shown in FIG. 2, the controller 170 may include a demultiplexer, an image processor, and the like.

In addition, the controller 170 may control overall operations of the control device 100. For example, the controller 170 may control the tuner unit 110 to select (tuning) a broadcast corresponding to a channel selected by a user or a pre-stored channel.

Meanwhile, the control device 100 may further include a photographing unit (not shown). The photographing unit may photograph a user. The photographing unit may be implemented with one camera, but is not limited thereto, and may be implemented with a plurality of cameras. Meanwhile, the photographing unit may be buried in the upper portion of the control device 100 or disposed separately. Image information photographed by the photographing unit may be input to the controller 170.

The controller 170 may detect a user's gesture based on an image photographed by the photographing unit or a detected signal from the sensor unit, or a combination thereof.

The controller 170 may recognize the location of a user, based on the image photographed by the photographing unit. For example, the controller 170 may determine the distance (z-axis coordinate) between a user and the control device 100.

The controller 170 may determine a direction for generating a transmission beam and/or a reception beam through the second communication circuit, among a plurality of directions. For example, the controller 170 may determine the direction for generating a transmission beam and/or a reception beam through the second communication circuit, among a plurality of directions, based on a signal to noise ratio (SNR), a received signal strength indication (RSSI), and the like.

The controller 170 may calculate an angle between the control device 100 and an external electronic device.

For example, the controller 170 may determine a direction for generating a transmission beam and/or a reception beam through the second communication circuit, among a plurality of directions, and may determine an angle corresponding to the determined direction as an angle between the control device 100 and an external electronic device.

For example, the controller 170 may receive data on a direction for generating a transmission beam and/or a reception beam from an external electronic device through the external device interface unit 130, that is, data on a direction used for communication with the control device 100, and may determine an angle between the control device 100 and an external electronic device based on the received direction data.

The controller 170 may obtain information on an object disposed around the control device 100, based on signals transmitted and received through the external device interface unit 130.

The controller 170 may perform an operation of transmitting a first signal of a mmWave band through at least one array antenna included in the second communication circuit, and receiving a second signal, which is a signal that the transmitted first signal is reflected by an object and returned, through at least one array antenna, in all directions.

To this end, a plurality of array antennas included in the second communication circuit may be disposed to face all directions or may be disposed to rotate in all directions based on a rotation shaft.

The controller 170 may calculate a distance between objects disposed around the control device 100 and the control device 100, based on a difference between the time of transmitting the first signal and the time of receiving the second signal. The controller 170 may calculate a distance between the control device 100 and an external electronic device, based on a difference between the time of transmitting a signal to the external electronic device through the external device interface unit 130 and the time of receiving a signal from the control device 100 by the external electronic device.

The controller 170 may calculate the distance between the control device 100 and the external electronic device, based on a signal received from the external electronic device through the external device interface unit 130.

For example, the controller 170 may calculate a received signal strength indication (RSSI) related to the strength of a signal received from an external electronic device through the external device interface unit 130, and may calculate a distance between the control device 100 and an external electronic device based on the calculated received signal strength indication.

Meanwhile, the controller 170 may determine a type of objects disposed around the control device 100, based on a result of receiving the second signal in all directions. For example, the controller 170 may generate an image (e.g. a point cloud image) corresponding to a reception result, based on a result of receiving the second signals in all directions, and may check an object corresponding to a user among objects disposed around the control device 100 from the image.

The controller 170 may perform voice recognition for a voice input inputted through a microphone.

The controller 170 may perform voice recognition using natural language processing (NLP) to extract a word included in the voice input and check a command corresponding to the extracted word.

Here, the natural language processing technology may refer to a technology of mechanically analyzing a human language phenomenon and processing to enable the electronic device to recognize the meaning of a corresponding language phenomenon.

The controller 170 may transmit data on voice input to an external server (not shown), receive a result of processing the voice input from the external server, and perform voice recognition.

For example, the controller 170 may transmit data on voice input to an external server, receive data on a word included in the voice input, a command corresponding to the word, etc from the external server, and perform voice recognition.

Meanwhile, the controller 170 may perform a pre-processing, such as noise processing, with respect to the voice input that is an object of voice recognition. Here, a pre-processing process may use a processing method of detecting only a voice section from an input signal, such as end-point detection, and a method of extracting a statistical feature that is relatively simple to compute from an input signal and distinguishing between a voice section and a silent section. In addition, the pre-processing process may include a noise processing process of removing noise.

The power supply unit 190 may supply corresponding power throughout the control device 100. In particular, power may be supplied to the controller 170, which can be implemented in the form of a system on chip (SOC), the audio output unit 185 for audio output, and the like.

Specifically, the power supply unit 190 may include a converter (not shown) that converts AC power into DC power and a DC/Dc converter (not shown) that converts the level of the DC power.

The remote control device 400 may transmit a user input to the user input interface unit 150. To this end, the remote control device 400 may use Bluetooth, Radio Frequency (RF) communication, Infrared Radiation (IR) communication, Ultra-wideband (UWB), ZigBee, or the like. In addition, the remote control device 400 may receive an image, voice, or data signal output from the user input interface unit 150, and display it on the remote control device 400 or output as voice from the remote control device 400.

Meanwhile, the block diagram of the control device 100 shown in FIG. 2 is only a block diagram for an embodiment of the present disclosure, and each component of the block diagram may be integrated, added, or omitted according to the specifications of the control device 100 actually implemented.

That is, if necessary, two or more components may be combined into one component, or one component may be subdivided into two or more components. In addition, functions performed in each block are for explaining an embodiment of the present disclosure, and the specific operation or device does not limit the scope of the present disclosure.

FIG. 3A is an example of an internal block diagram of the image display apparatus of FIG. 1.

Figure 3:
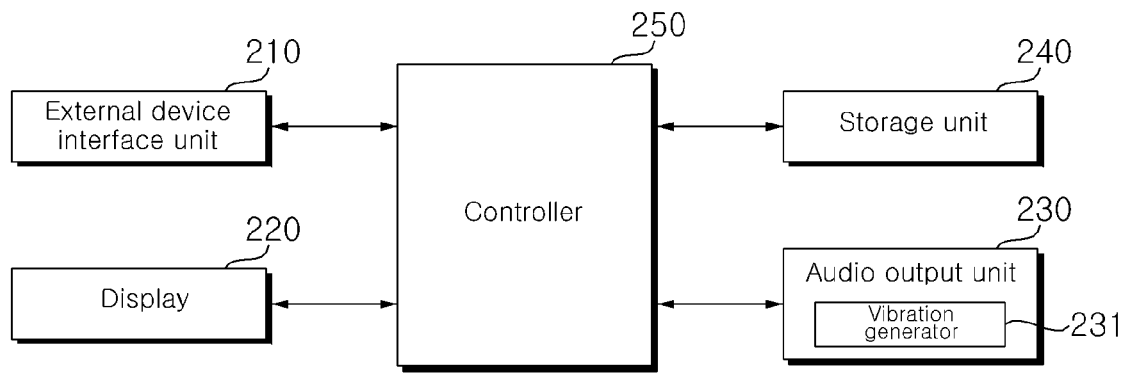
FIG. 3 is an example of an internal block diagram of an image display apparatus of FIG. 1.

Referring to FIG. 3, the image display apparatus 200 may include an external device interface unit 210, a display 220, an audio output unit 230, a storage unit 240, and/or a controller 250.

The external device interface unit 210 may transmit/receive a signal including data with a connected external device. For example, the external device interface unit 210 may be connected to the control device 100 by wire and may receive a signal from the control device 100. For example, the external device interface unit 210 may receive an image signal and/or a voice signal from the control device 100, and may receive a control signal.

The external device interface unit 210 may include a plurality of communication circuits. For example, the external device interface unit 210 may include a first communication circuit (not shown) using a first frequency band and a second communication circuit (not shown) using a second frequency band higher than the first frequency band.

The first communication circuit may use a first frequency band including at least one of a 2.4 GHz band and a 5 GHz band used for Bluetooth, Wi-Fi, and the like. The second communication circuit may use a second frequency band including at least a part of a frequency band of 25 GHz to 100 GHz. For example, the first communication circuit may receive a control signal from the control device 100 connected through communication, and the second communication circuit may transmit a large amount of image signal and/or voice signal from the control device 100 connected through communication.

The second communication circuit may include an array antenna having a plurality of antenna elements, a plurality of phase shifters corresponding to the plurality of antenna elements, and the like.

The second communication circuit may control a phase of signals transmitted and received through a plurality of antenna elements through a plurality of phase shifters to generate a transmission beam and/or a reception beam in a specific direction among a plurality of directions.

The display 220 may convert an image signal, data signal, OSD signal, control signal processed by the controller 250, or an image signal, data signal, control signal, etc received from the control device 100 through the external device interface unit 210 to generate a drive signal.

The display 220 may include a display panel (not shown) having a plurality of pixels and a panel driving unit (not shown).

A plurality of pixels provided in the display panel may include a RGB sub-pixel. Alternatively, the plurality of pixels provided in the display panel may include a RGBW sub-pixel.

The display 220 may convert an image signal, data signal, OSD signal, control signal processed by the controller 250, or an image signal, data signal, OSD signal, control signal, etc received from the control device 100 through the external device interface unit 210 to generate a drive signal for a plurality of pixels.

The display 220 may be a plasma display panel (PDP), a liquid crystal display (LCD), an organic light emitting diode (OLED), a flexible display, or the like, and may also be a 3D display. The 3D display 220 may be divided into a non-glasses type and a glasses type.

The panel driving unit may drive the display panel, based on a control signal and data signal transmitted from the controller 250 or a signal transmitted from the control device 100 through the external device interface unit 210.

The panel driving unit may include a gate driver and a data driver that supply a scan signal and an image signal to the display panel through a gate line and a data line, and a timing controller for controlling the gate driver and the data driver in response to a control signal.

Meanwhile, the display 220 may be configured as a touch screen and used as an input device in addition to an output device.

The audio output unit 230 may include at least one speaker (not shown).

The audio output unit 230 may include at least one vibration generator 231. The vibration generator 231 may include an exciter that vibrates the display panel 310 included in the display 220.

The vibration generator 231 may be mounted in the display panel 310 of the display 220, and vibrate the display panel 310 in response to a voice signal. For example, the vibration generator 231 may be mounted in the rear surface of the display panel 310, and vibrate the display panel 310 so that sound is output to the front of the display panel 310 where a user is located.

Meanwhile, a plurality of vibration generators 231 may be mounted in the display panel 310.

The plurality of vibration generators 231 may independently vibrate an area where each vibration generator is disposed. For example, the first vibration generator 231a may be attached to the lower area of the display panel 310 may vibrate the lower area of the display panel 310 so that high-pitched sound and low-pitched sound are simultaneously generated, and the second vibration generator 231b may be attached to the upper area of the display panel 310, and may vibrate the upper area of the display panel 310 to generate high-pitched sound.

The storage unit 240 may store a program for each signal processing and control in the controller 250, or may store signal-processed image, voice, or data signal. For example, the storage unit 240 may store application programs designed for the purpose of performing various tasks that can be processed by the controller 250, and upon request of the controller 250, may selectively provide some of the stored application programs.

Programs stored in the storage unit 240 are not particularly limited as long as they can be executed by the controller 250.

The controller 250 may include at least one processor, and may control the overall operation of the image display apparatus 200 by using the processor. Here, the processor may be a general processor such as a central processing unit (CPU). Obviously, the processor may be a dedicated device such as an ASIC or other hardware-based processor.

Meanwhile, according to various embodiments, the image display apparatus 200 may not include the storage unit 240 and/or the controller 250.

For example, the image display apparatus 200 may be a device that operates according to a control signal received from the control device 100, and may be a device that outputs an image received from the control device 100 intactly through the display 200, or provides a function of outputting a voice signal intactly through the audio output unit 230.

Figure 4:
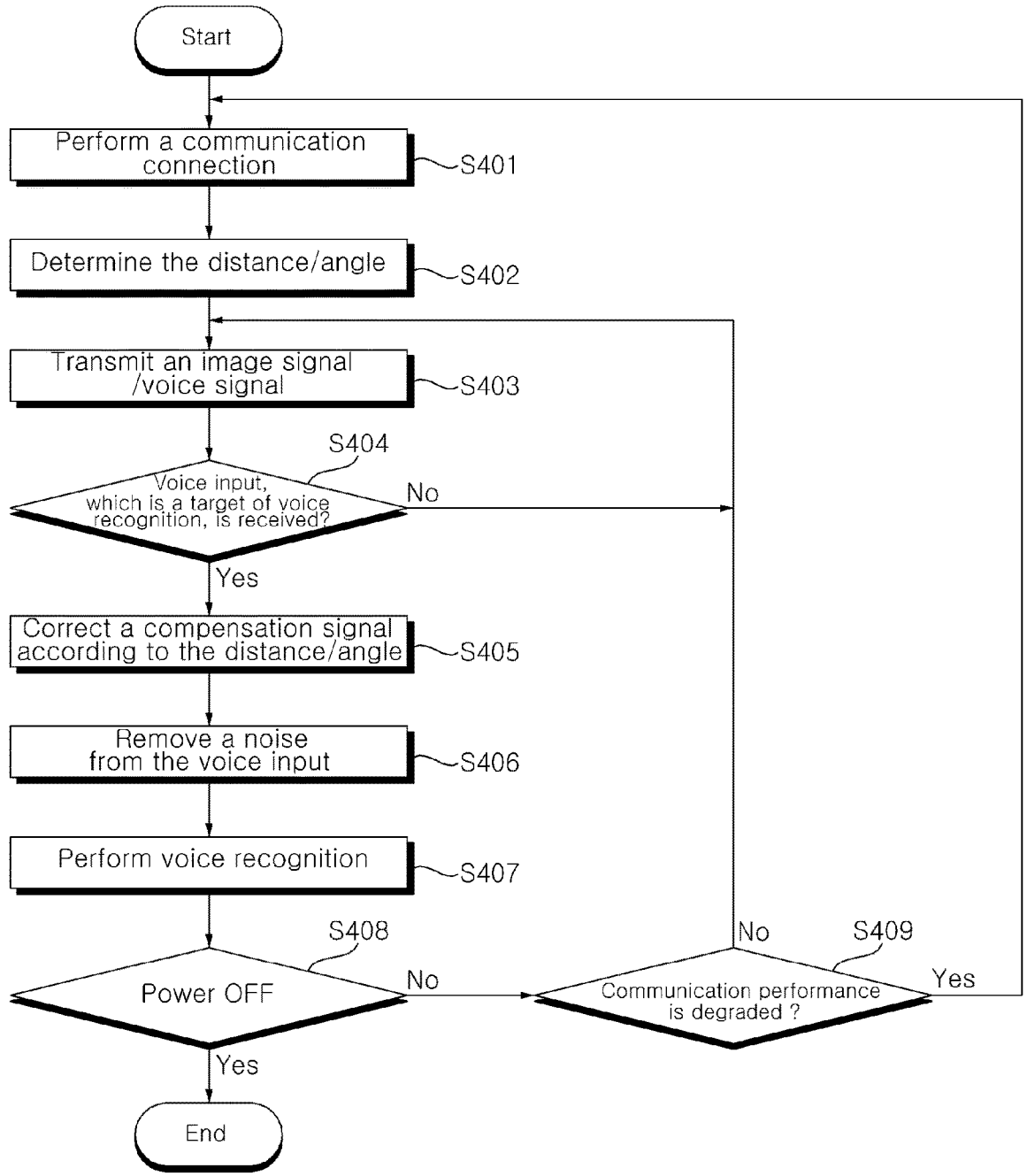
FIG. 4 is a flowchart of a method of operating a control device, according to an embodiment of the present disclosure.

FIG. 4 is a flowchart of a method of operating a control device, according to an embodiment of the present disclosure, and FIGS. 5 to 8 are diagrams for explaining the operation of the control device.

Referring to FIG. 4, the control device 100 may perform a communication connection with the image display apparatus 200 through the external device interface unit 130, at operation S401.

The control device 100 may perform a communication connection with the image display apparatus 200 by transmitting and receiving signals in a first frequency band including at least one of a 2.4 GHz band and a 5 GHz band through a first communication circuit.

The control device 100 may perform a communication connection with the image display apparatus 200 by transmitting and receiving signals in the second frequency band including at least a part of a frequency band of 25 GHz to 100 GHz through the second communication circuit. In this case, the control device 100 may perform a communication connection with the image display apparatus 200 in the second frequency band by using a beam forming method.

Figure 5:
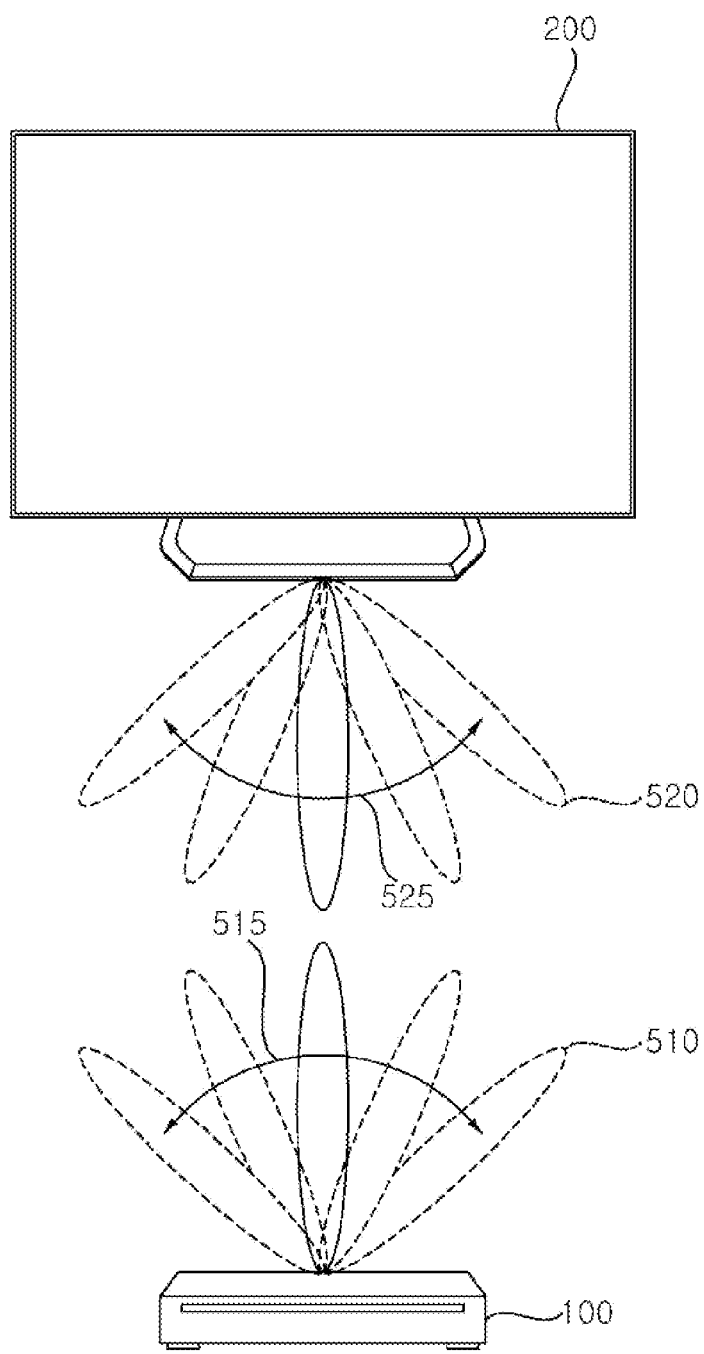
FIGS. 5 to 8 are diagrams for explaining the operation of the control device.

Referring to FIG. 5, the control device 100 may perform a transmission beam sweeping 515 at least once by sequentially transmitting a transmission beams 510 in a plurality of directions, by using a plurality of antenna elements included in the array antenna. In addition, the image display apparatus 200 may also perform a reception beam sweeping 525 at least once by sequentially transmitting a reception beam 520 in a plurality of directions while the control device 100 performs the transmission beam sweeping 515.

At this time, the control device 100 and the image display apparatus 200 may form the transmission beams 510 and the reception beam 520 of a narrow radiation pattern, respectively.

The control device 100 may determine a direction used for communication with the image display apparatus 200 among a plurality of directions in which the transmission beam sweeping 515 is performed. For example, based on the communication performance results shown in Table 1 below, the control device 100 may determine a direction having the highest signal-to-noise ratio (SNR), among the plurality of directions in which the transmission beam sweeping 515 is performed, as a direction used for communication with the image display device 200. For example, the control device 100 may determine a direction in which a signal having the largest received signal strength indication (RSSI) is received, among the plurality of directions in which the transmission beam sweeping 515 is performed, as a direction used for communication with the image display apparatus 200.

TABLE 1

| Horizontal angle | Transmit power [dBm] | SNR [dB] |
| --- | --- | --- |
| −45° | −34.9 | 18.5 |
| −30° | −34.5 | 19.3 |
| −15° | −31.8 | 20.6 |
| 0° | −29.7 | 21.4 |
| 15° | −30.4 | 21.3 |
| 30° | −31.3 | 20.1 |
| 45° | −32.2 | 20.8 |

Here, Table 1 shows, in the case where the front surface of the control device 100 and the front surface of the image display device 200 face each other, a table for the result obtained when the image display device 200 generates a reception beam in a front surface direction (−x-axis direction) and the control device 100 performs the transmission beam sweeping 515 in a front surface direction (x-axis direction), and a table for the result obtained when the image display device 200 generates a transmission beam in a front surface direction (−x-axis direction) and the control device 100 performs the reception beam sweeping 515 in a front surface direction (x-axis direction).

In addition, the image display apparatus 200 may determine a direction used for communication with the control device 100, among a plurality of directions in which the reception beam sweeping 525 is performed, identically/similarly to the control device 100. Meanwhile, in the description of this drawing, it is described that the control device 100 performs the transmission beam sweeping 515 and the image display apparatus 200 performs the reception beam sweeping 525, but the present disclosure is not limited thereto, and the control device 100 may determine a direction used for communication with the image display apparatus 200 by performing the reception beam sweeping.

Referring back to FIG. 4, the control device 100 may determine the distance and angle between the control device 100 and the image display apparatus 200, at operation S402. The control device 100 may determine a distance between the control device 100 and the image display apparatus 200, based on at least one of a strength of the signal received from the image display apparatus, and a difference between the time when a signal is output from the control device 100 and the time when a signal is received from the image display apparatus 200.

The control device 100 may determine an angle corresponding to a direction in which the transmission beam and/or the reception beam are generated through the second communication circuit, among a plurality of directions, as an angle between the control device 100 and an external electronic device. In this case, the control device 100 may determine an angle between the control device 100 and the image display apparatus 200, based on the direction in which the front surface of the control device 100 faces.

The control device 100 may transmit an image signal and/or a voice signal to the image display apparatus 200, at operation S403. At this time, the control device 100 may transmit a control signal for controlling the operation of the image display apparatus 200 through the first communication circuit using a first frequency band, and a large-capacity image signal and/or voice signal to the image display apparatus 200 through the second communication circuit using a second frequency band higher than the first frequency band.

At operation S404, the control device 100 may check whether a voice input, which is a target of voice recognition, is received through a microphone.

When a voice input is received through the microphone, the control device 100 may generate and correct a compensation signal corresponding to the voice signal transmitted to the image display apparatus 100, at operation S405.

Here, the compensation signal may mean a signal corresponding to sound output from the image display apparatus 100 according to the voice signal. For example, when the control device 100 processes a voice signal transmitted to the image display apparatus 100 and the image display apparatus 100 outputs sound according to a corresponding voice signal, the control device 100 may generate a signal corresponding to a sound expected to be received through the microphone, as a compensation signal.

At this time, the compensation signal generated by the control device 100 may be a signal corresponding to a voice input expected to be received through the microphone, in the case where the control device 100 and the image display apparatus 200 are located according to preset distance (e.g. 1 m) and angle (e.g. 0°). In addition, the control device 100 may generate a compensation signal, based on a setting value (e.g. volume, mono output, stereo output, etc.) set in relation to the sound output of the image display apparatus 200.

The control device 100 may correct the compensation signal, based on the distance and angle between the control device 100 and the image display apparatus 200.

Figure 6:
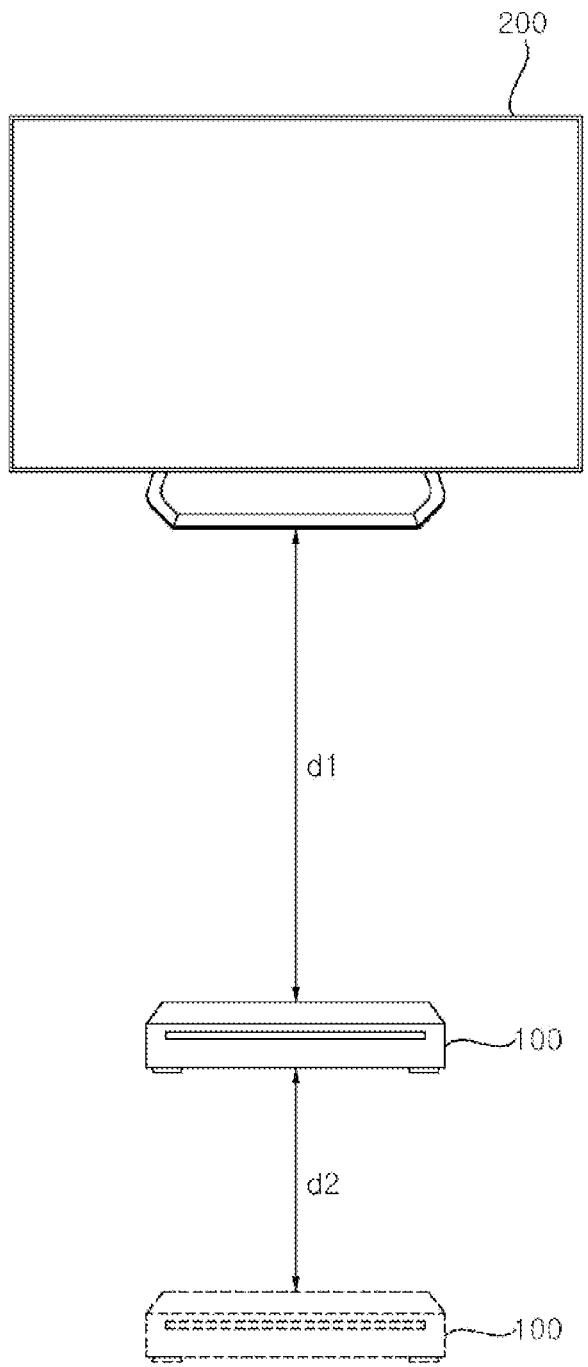

Referring to FIG. 6, when the control device 100 and the image display apparatus 200 are located to face each other, an angle between the control device 100 and the image display apparatus 200 may be 0°. Meanwhile, when the distance between the control device 100 and the image display apparatus 200 is d1 and moves away in the −x-axis direction by d2, the amplitude of the voice input corresponding to the sound that is output from the image display apparatus 200, which is input to a microphone of the control device 100, is reduced, in comparison with a case where the distance is d1.

Considering this point, the control device 100 may correct the amplitude of the compensation signal to increase as much as the distance between the control device 100 and the image display apparatus 200 decreases, and may correct the amplitude of the compensation signal to decrease as much as the distance between the control device 100 and the image display apparatus 200 increases.

Figure 7:
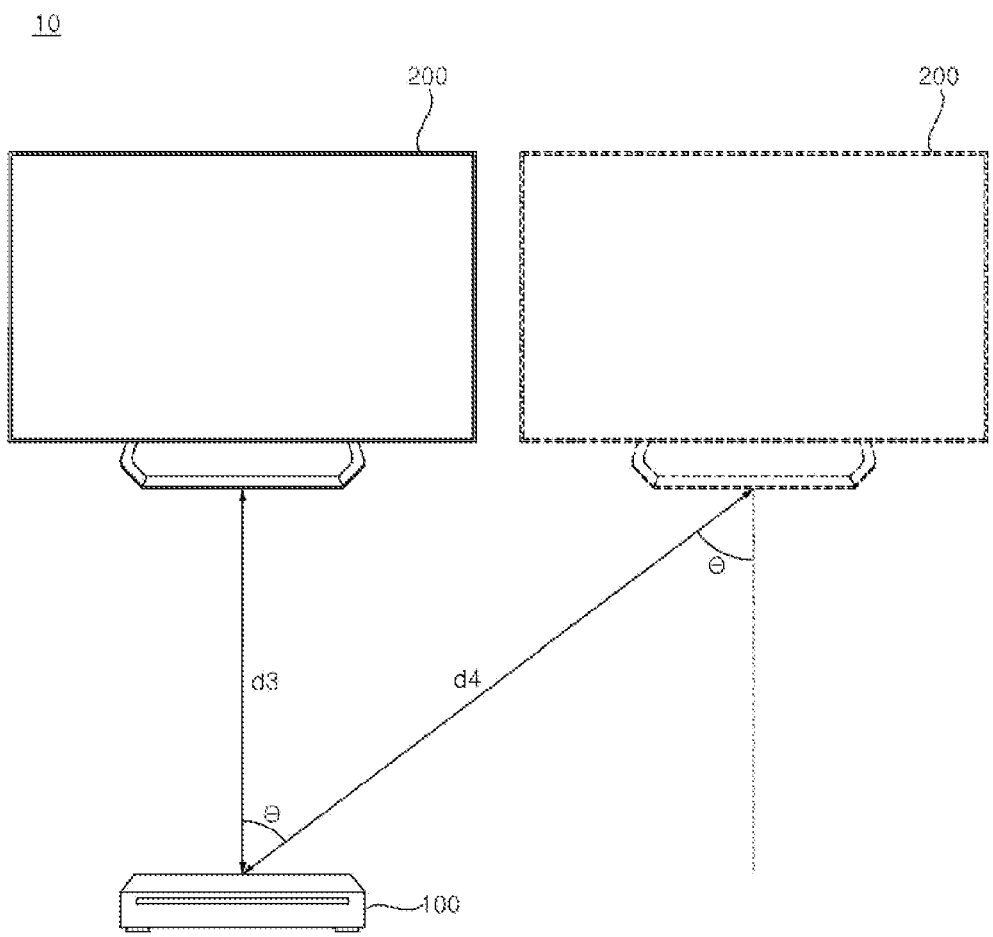

Meanwhile, referring to FIG. 7, in a state where the distance between the control device 100 and the image display apparatus 200 is d3 and the angle between the control device 100 and the image display apparatus 200 is 0°, when the image display apparatus 200 moves a certain distance in the y-axis direction, the distance between the control device 100 and the image display apparatus 200 may be changed to d4 and the angle between the control device 100 and the image display apparatus 200 may be changed to 0.

In this case, the control device 100 may determine that the angle between the control device 100 and the image display apparatus 200 is 0, based on the direction used for communication with the image display apparatus 200. In addition, the image display apparatus 200 may also determine that the angle between the control device 100 and the image display apparatus 200 is 0, based on the direction used for communication with the control device 100.

Meanwhile, the amplitude of the voice input corresponding to the sound output from the image display apparatus 200, which is input to the microphone of the control device 100, may decrease, and furthermore, the phase of the voice input corresponding to the sound may be changed according to the angle θ.

That is, since the image display apparatus 200 outputs sound toward the front surface direction (−x-axis direction), the phase of the voice input corresponding to the sound output from the image display apparatus 200 may be changed in response to the angle θ.

In consideration of this point, the control device 100 may correct the amplitude of the compensation signal to decrease as much as the distance between the control device 100 and the image display apparatus 200 increases, and may correct the phase of the compensation signal to be changed as much as the angle between the control device 100 and the image display apparatus 200 is changed.

Figure 8:
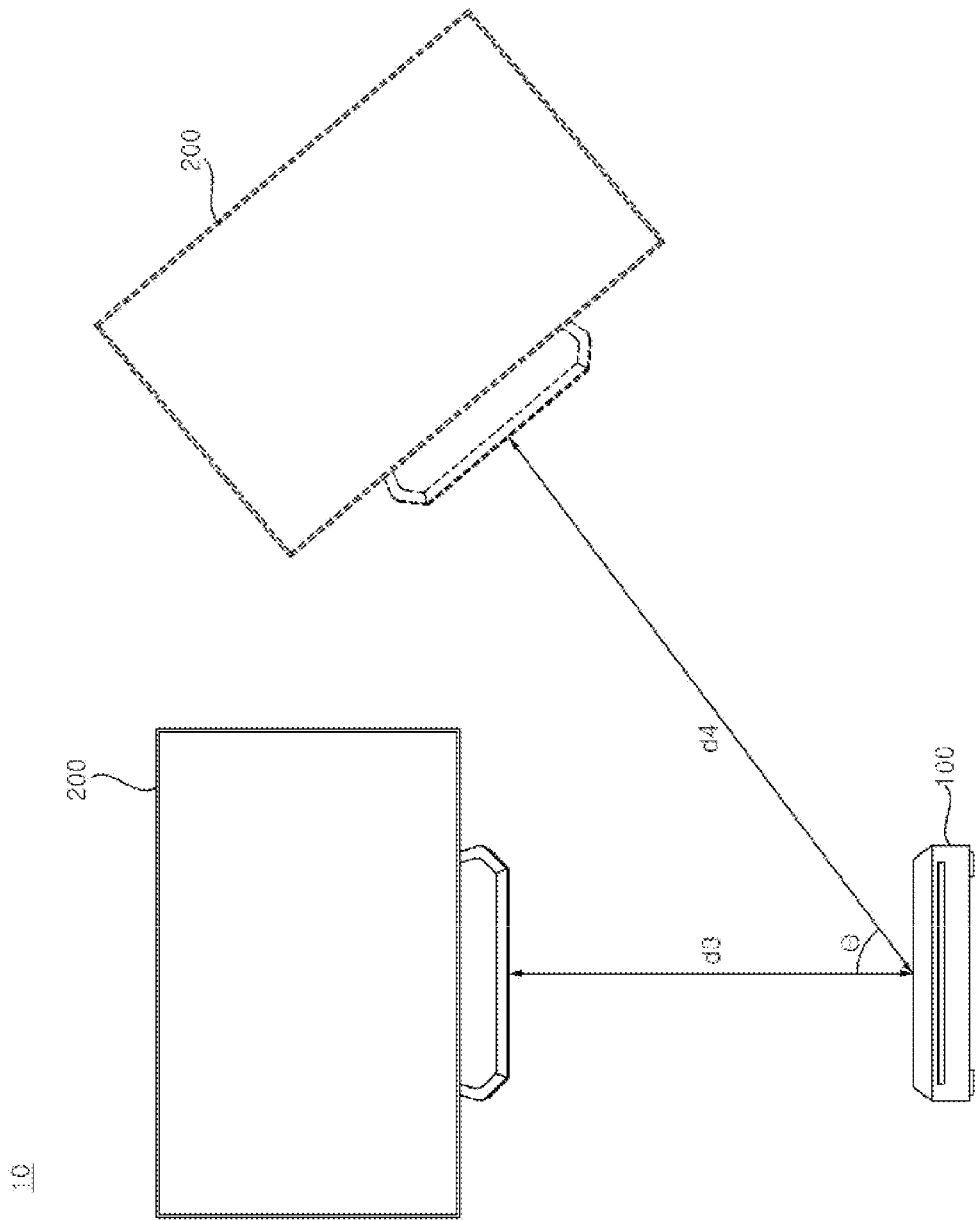

Meanwhile, referring to FIG. 8, in a state where the distance between the control device 100 and the image display apparatus 200 is d3 and the angle between the control device 100 and the image display apparatus 200 is 0°, when the image display apparatus 200 moves a certain distance in the y-axis direction, the distance between the control device 100 and the image display apparatus 200 may be changed to d4 and the angle between the control device 100 and the image display apparatus 200 may be changed to θ.

Meanwhile, unlike in FIG. 7, when the image display apparatus 200 moves a certain distance in the y-axis direction and then rotates so that the front surface of the image display apparatus 200 faces the control device 100, the image display apparatus 200 outputs sound toward the control device 100 which is the front surface direction, the angle between the control device 100 and the image display apparatus 200 needs to be changed to 0°.

To this end, the control device 100 may adjust an angle between the control device 100 and the image display apparatus 200, based on data received from the image display apparatus 200. For example, the control device 100 may check that the direction used for communication with the control device 100 is 0°, and may change the angle between the control device 100 and the image display apparatus 200 to 0°, based on data on the direction used for communication with the control device 100 received from the image display apparatus 200.

Referring back to FIG. 4, the control device 100 may remove a noise included in the voice input, based on the corrected compensation signal, at operation S406. Here, the noise may refer to a remaining portion of the voice input excluding the voice uttered by a user which is the target of voice recognition.

For example, the control device 100 may compare the voice input with the corrected compensation signal and remove a part corresponding to the corrected compensation signal from among the voice input. In this case, a part corresponding to the corrected compensation signal, removed from the audio input, may mean a part corresponding to the sound that is output from the image display apparatus 200 and input through the microphone of the control device 100.

At operation S407, the control device 100 may perform voice recognition on a remaining portion from which a portion corresponding to the corrected compensation signal is removed, from among the voice input, and perform an operation corresponding to the result of voice recognition.

At operation S408, the control device 100 may determine whether to turn off the power of at least one of the control device 100 and the image display apparatus 200.

For example, when a power on/off signal for at least one of the control device 100 and the image display apparatus 200 is received from the remote control device 300, as a result of performing voice recognition, if it is determined that a user uttered a power on/off command, the control device 100 may decide to turn off the power of at least one of the control device 100 and the image display apparatus 200.

At operation S409, the control device 100 may check whether the communication performance of the image display apparatus 200 is degraded, when the power of the control device 100 and the image display apparatus 200 is not turned off. For example, the control device 100 may check whether the communication performance of the image display apparatus 200 is less than a preset standard performance, based on the signal-to-noise ratio (SNR), the received signal strength indication (RSSI), the transmission power of the transmitted signal, etc.

When the communication performance between the control device 100 and the image display apparatus 200 is degraded, the control device 100 branches to operation S401, and may perform a communication connection with the image display apparatus 200 again, and determine again the distance and angle between the control device 100 and the image display apparatus 200.

If the communication performance between the control device 100 and the image display apparatus 200 is not degraded, it branches to operation S403, and the image signal and/or voice signal may be continuously transmitted to the image display apparatus 200, and it may be continuously checked whether the voice input is received. Meanwhile, the control device 100 may continuously transmit an image signal and/or a voice signal to the image display apparatus 200, even while processing the voice input.

Figure 9:
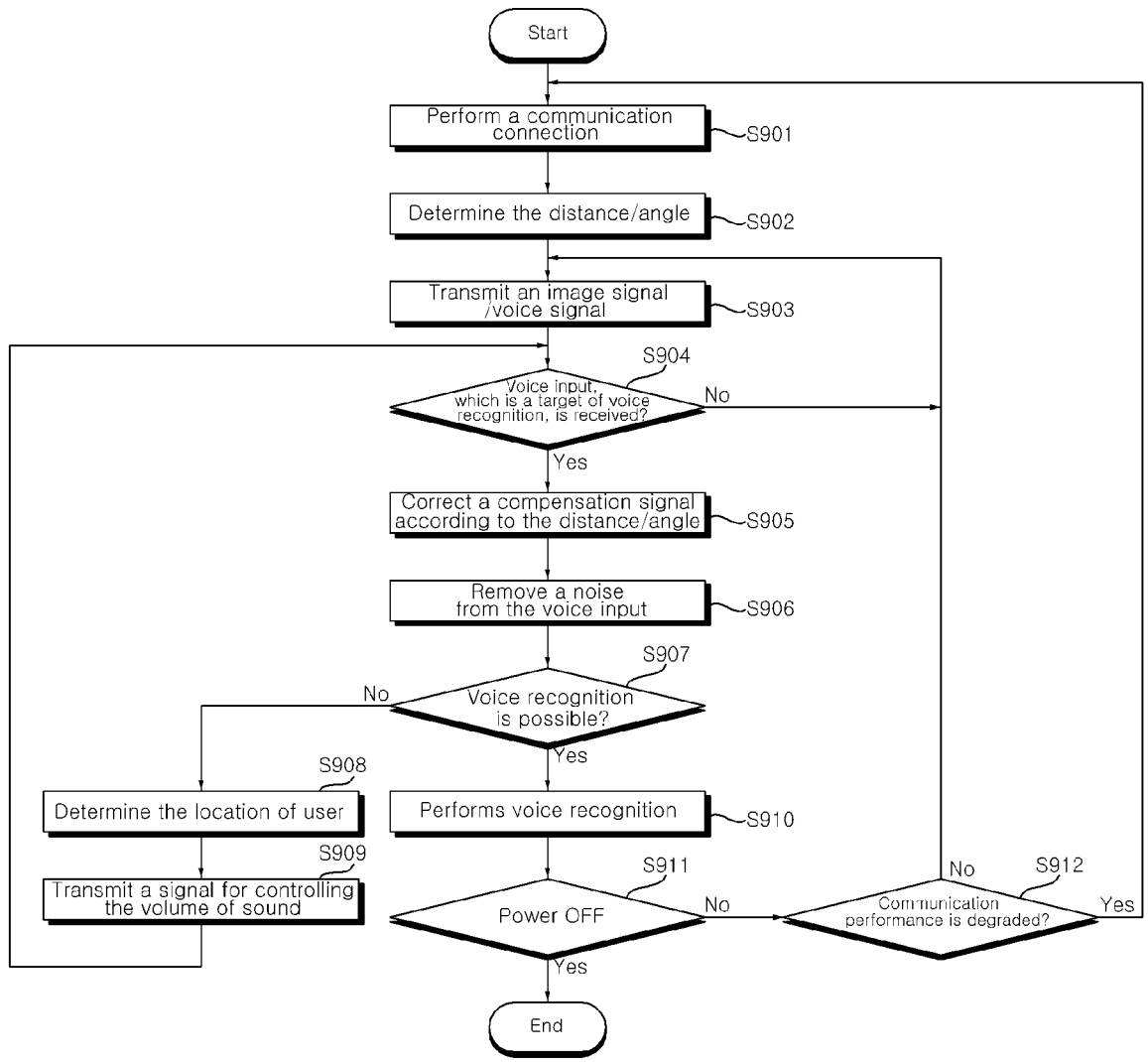
FIG. 9 is a flowchart of a method of operating a control device, according to another embodiment of the present disclosure.
Figure 10:
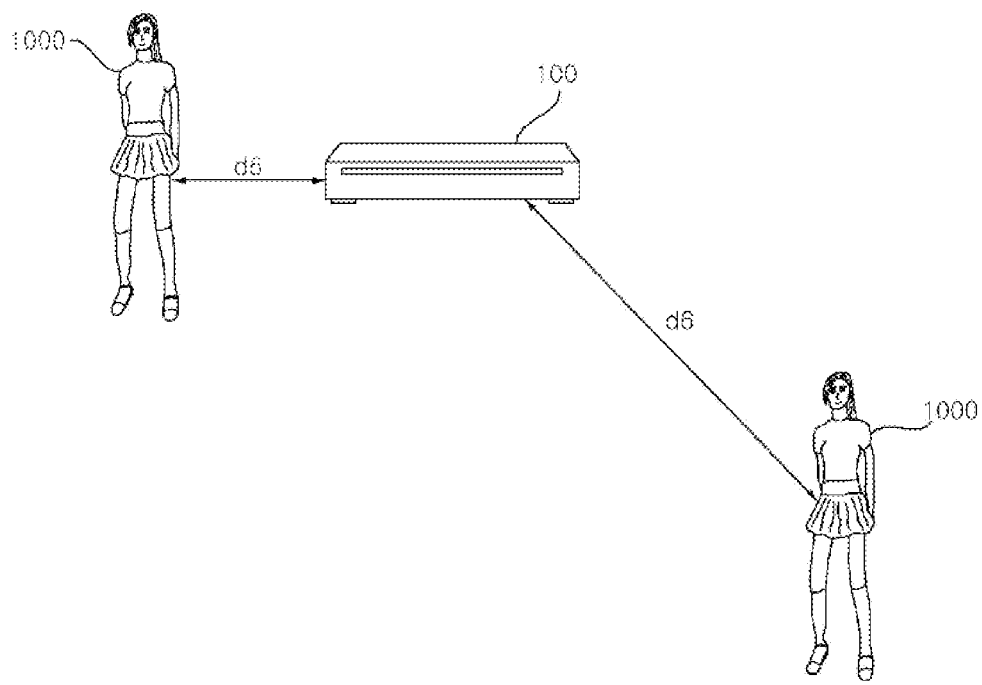
FIG. 10 is a diagram for explaining the operation of the control device.

FIG. 9 is a flowchart of a method of operating a control device according to another embodiment of the present disclosure, and FIG. 10 is a diagram for explaining the operation of the control device. Detailed descriptions of contents overlapping those described in FIGS. 4 to 8 will be omitted.

Referring to FIG. 9, the control device 100 may perform a communication connection with the image display apparatus 200 through the external device interface unit 130, at operation S901.

The control device 100 may determine the distance and angle between the control device 100 and the image display apparatus 200, at operation S902.

The control device 100 may transmit an image signal and/or a voice signal to the image display apparatus 200, at operation S903.

At operation S904, the control device 100 may check whether a voice input, which is a target of voice recognition, is received through a microphone.

When a voice input is received through the microphone at operation S905, the control device 100 may generate and correct a compensation signal corresponding to the voice signal transmitted to the image display apparatus 100.

The control device 100 may remove the noise included in the voice input, based on the corrected compensation signal, at operation S906.

At operation S907, the control device 100 may determine whether the voice recognition can be performed on the remaining portion of the voice input from which a portion corresponding to the corrected compensation signal is removed.

For example, the control device 100 may perform pre-processing on the remaining portion of the voice input from which the portion corresponding to the corrected compensation signal is removed, by using a method of extracting statistical features and distinguishing between a voice section and a silent section. In this case, when the voice section and the silent section are not distinguished for the remaining portion of the voice input, the control device 100 may determine that voice recognition cannot be performed for the remaining portion of the voice input.

For example, the control device 100 uses a method based on linear predictive coefficients (LPC) and a Mel frequency cepstral coefficients (MFCC) extraction method, etc, so that it can be attempted to extract a valid feature vector valid for voice recognition from the remaining portion of the voice input from which the portion corresponding to the corrected compensation signal is removed. In this case, if a feature vector effective for voice recognition is not extracted from the remaining portion of the voice input, the control device 100 may determine that voice recognition cannot be performed on the remaining portion of the voice input.

At operation S908, the control device 100 may determine the location of a user, when voice recognition cannot be performed for the remaining portion of the voice input from which the portion corresponding to the corrected compensation signal is removed.

The control device 100 may perform an operation of transmitting the first signal of the mmWave band through at least one array antenna included in the second communication circuit, and receiving a second signal, which is a signal that the transmitted first signal is reflected by an object and returned, through at least one array antenna, in all directions.

At this time, the control device 100 may determine the type of objects disposed around the control device 100, based on the result of receiving the second signal in all directions, and may identify an object corresponding to a user among objects disposed around the control device 100.

In addition, the control device 100 may calculate a distance between the control device 100 and an object corresponding to a user, based on a difference between the time of transmitting the first signal toward the object corresponding to the user and the time of receiving the second signal that is reflected by the object corresponding to the user and returned.

At operation S909, the control device 100 may transmit a control signal for controlling the volume of sound output from the image display apparatus 200 to the image display apparatus 200, based on the distance between the control device 100 and the object corresponding to the user. At this time, the control device 100 may transmit a control signal for controlling the volume of sound output from the image display apparatus 200 to the image display apparatus 200 through the first communication circuit.

Referring to FIG. 10, when a user utters a voice with the same loudness, when the distance between the control device 100 and an object 1000 corresponding to the user is d6, in comparison with a case of the short distance d5, the amplitude of the voice input inputted to the microphone of the control device 100 may be smaller.

At this time, when the distance between the control device 100 and the object 1000 corresponding to the user is d6, in comparison with the case of the short distance d5, the control device 100 may control the image display apparatus 100 to decrease the volume of the sound output from the image display apparatus 100.

Referring back to FIG. 9, when transmitting a control signal for controlling the volume of sound output from the image display apparatus 100 to the image display apparatus 100, the control device 100 may output a message prompting the user to utter a voice again. For example, the control device 100 may output a message prompting the user to utter a voice again through the audio output unit 185.

Meanwhile, at operation S910, when it is possible to perform voice recognition for the remaining portion of the voice input from which the portion corresponding to the corrected compensation signal is removed, the control device 100 performs voice recognition for the remaining portion of the voice input, and may perform an operation corresponding to a result of performing voice recognition.

At operation S911, the control device 100 may determine whether to turn off the power of at least one of the control device 100 and the image display apparatus 200.

At operation S409, when the power of the control device 100 and the image display apparatus 200 is not turned off, the control device 100 may check whether communication performance of the image display apparatus 200 is degraded.

When the communication performance between the control device 100 and the image display apparatus 200 is degraded, the control device 100 may branch to operation S901, and may establish a communication connection with the image display apparatus 200 again, and may determine the distance and angle between the control device 100 and the image display apparatus 200 again.

If the communication performance between the control device 100 and the image display apparatus 200 is not deteriorated, it branches to operation S903, and the image signal and/or voice signal may be continuously transmitted to the image display apparatus 200, and it may be continuously checked whether the voice input is received.

As described above, according to various embodiments of the present disclosure, considering the angle and distance between the control device 100 and the image display apparatus 200, the amplitude, phase, and the like of the compensation signal corresponding to the sound output from the image display device 200 may be corrected, and a portion corresponding to a sound among voice input by using the corrected compensation signal may be more accurately removed, thereby improving the accuracy of voice recognition for a voice portion uttered by a user.

In addition, according to various embodiments of the present disclosure, when it is difficult to recognize the voice of the voice portion uttered by a user, the location of the user uttering the voice is checked, and the volume of the sound output from the image display device 200 is controlled to be lowered according to the user's location, thereby further improving the accuracy of voice recognition for the voice portion uttered by a user.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Meanwhile, the operating method of the image display apparatus and/or the control device of the present disclosure can be implemented as processor-readable codes in a processor-readable recording medium provided in the image display apparatus and/or the control device. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A control device comprising:
    an external device interface unit configured to communicate with an image display apparatus;
    a microphone; and
    a controller configured to:
    determines an angle and a distance between the control device and the image display apparatus, based on a signal transmitted and received through the external device interface unit,
    generates a compensation signal corresponding to a voice signal transmitted to the image display apparatus based on a voice input is-received through the microphone,
    correct a phase of the compensation signal according to the determined angle,
    correct an amplitude of the compensation signal according to the determined distance, and
    process the voice input based on the corrected compensation signal.

2. The control device of claim 1, wherein the compensation signal is a signal corresponding to sound output from the image display apparatus according to the voice signal, wherein the controller is configured to:
    removes a portion corresponding to the sound output from the image display apparatus from the voice input, based on the corrected compensation signal, and
    performs a voice recognition for the voice input from which the portion is removed.

3. The control device of claim 1, wherein the external device interface unit comprises at least one array antenna having a plurality of antenna elements,
    wherein the controller is configured to:
    determines a direction used for communication with the image display apparatus through the array antenna, among a plurality of directions, and
    determines the angle, based on the determined direction.

4. The control device of claim 3, wherein the controller is configured to:
    receives data on a direction used for communication with the control device from the image display apparatus, and
    determines the angle, based on the received data on a direction.

5. The control device of claim 4, wherein the controller is configured to determines the distance based on at least one of an intensity of a signal received from the image display apparatus and a difference between a time point at which a signal is output from the control device and a time point at which a signal is received from the image display apparatus.

6. The control device of claim 5, wherein the external device interface unit comprises:
    a first communication circuit using a first frequency band; and
    a second communication circuit using a second frequency band higher than the first frequency band,
    wherein the controller is configured to:
    transmits a control signal to the image display apparatus through the first communication circuit, and
    transmits at least one of an image signal and the voice signal to the image display apparatus through the second communication circuit.

7. The control device of claim 6, wherein the first frequency band comprises at least one of a 2.4 GHz band and a 5 GHz band, and
    wherein the second frequency band comprises at least a portion of a frequency band of 25GHz to 100GHz.

8. The control device of claim 2, wherein the controller is configured to:
    calculates a distance between an object corresponding to a user and the control device, based on a signal transmitted and received through the external device interface unit, and
    when the voice recognition fails, transmits a control signal for lowering a volume of sound output from the image display apparatus to the image display apparatus, based on the distance between the object corresponding to the user and the control device.

9. The control device of claim 8, wherein the external device interface unit comprises at least one array antenna having a plurality of antenna elements, and
    wherein the controller is configured to:
    performs an operation of transmitting a first signal through the array antenna, and receiving a second signal, which is a signal that the first signal is reflected by an object, through the array antenna, in all directions, and
    calculates the distance between the object corresponding to the user and the control device, based on a result of receiving the second signal in the all directions.

10. A system comprising an image display apparatus and a control device, wherein the image display apparatus is configured to outputs sound through at least one speaker, based on a voice signal received from the control device,
  wherein the control device is configured to:
    determines an angle and a distance between the control device and the image display apparatus, based on a signal that is mutually transmitted and received with the image display apparatus,
    generates a compensation signal corresponding to the voice signal transmitted to the image display apparatus based on a voice input received through a microphone of the control device,
    correct a phase of the compensation signal according to the determined angle,
    correct an amplitude of the compensation signal according to the determined distance, and
    processes the voice input, based on the corrected compensation signal.

11. The system of claim 10, wherein the compensation signal is a signal corresponding to sound output from the image display apparatus according to the voice signal,
  wherein the control device is configured to:
    removes a portion corresponding to the sound output from the image display apparatus from the voice input, based on the corrected compensation signal, and
    performs a voice recognition for the voice input from which the portion is removed.

12. The system of claim 10, wherein the image display apparatus and the control device comprise at least one array antenna having a plurality of antenna elements respectively, and
  wherein the control device is configured to:
    determines a first direction used for communication with the image display apparatus through the array antenna, among a plurality of directions, and
    determines the angle, based on the first direction.

13. The system of claim 12, wherein the image display apparatus is configured to:
    determines a second direction used for communication with the control device through the array antenna, among a plurality of directions,
    transmits data for the second direction to the control device,
  wherein the control device is configured to determines the angle, based on data on the second direction received from the image display apparatus.

14. The system of claim 13, wherein the control device is configured to determines the distance based on at least one of an intensity of a signal received from the image display apparatus and a difference between a time point at which a signal is output from the control device and a time point at which a signal is received from the image display apparatus.

15. The system of claim 14, wherein the image display apparatus and the control device respectively comprise:
    a first communication circuit using a first frequency band; and
    a second communication circuit using a second frequency band higher than the first frequency band,
  wherein the control device is configured to:
    transmits a control signal to the image display apparatus through the first communication circuit, and
    transmits at least one of an image signal and the voice signal to the image display apparatus through the second communication circuit.

16. The system of claim 15, wherein the first frequency band comprises at least one of a 2.4 GHz band and a 5 GHz band, and
  wherein the second frequency band comprises at least a portion of a frequency band of 25GHz to 100GHz.

17. The system of claim 11, wherein the control device is configured to:
    calculates a distance between an object corresponding to a user and the control device, based on a signal transmitted and received from/to the control device, and
    when the voice recognition fails, transmits a control signal for lowering a volume of sound output from the image display apparatus to the image display apparatus, based on the distance between the object corresponding to the user and the control device,
  wherein the image display apparatus is configured to adjusts a volume of the sound output from the speaker to be lowered, based on the control signal received from the control device.

18. The system of claim 17, wherein the image display apparatus and the control device comprise at least one array antenna having a plurality of antenna elements respectively, and
  wherein the control device is configured to:
    performs an operation of transmitting a first signal through the array antenna, and receiving a second signal, which is a signal that the first signal is reflected by an object, through the array antenna, in all directions, and
    calculates the distance between the object corresponding to the user and the control device, based on a result of receiving the second signal in the all directions.

* * * * *